(12) United States Patent  
Huang et al.

(10) Patent No.: US 8,474,922 B2  
(45) Date of Patent: Jul. 2, 2013

(54) ELECTRONIC DEVICE ENCLOSURE WITH ROTATABLE DOOR

(75) Inventors: Ri-Dong Huang, Shenzhen (CN); Chang-Zheng Xu, Shenzhen (CN); Hsuan-Tsung Chen, Tu-Cheng (TW); Guang-Yao Lee, Tu-Cheng (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 332 days.

(21) Appl. No.: 13/070,469

(22) Filed: Mar. 23, 2011

(65) Prior Publication Data

US 2012/0146472 A1 Jun. 14, 2012

(30) Foreign Application Priority Data

Dec. 8, 2010 (CN) .......................... 2010 1 0579052

(51) Int. Cl.
*A47B 97/00* (2006.01)
(52) U.S. Cl.
USPC ........................ 312/223.2; 312/319.2; 49/386
(58) Field of Classification Search
USPC ............. 312/223.1, 223.2, 319.1, 319.2, 326, 312/327, 328, 292; 49/386, 323; 361/679.02, 361/679.33; 292/175
See application file for complete search history.

(56) References Cited

U.S. PATENT DOCUMENTS

| | | | |
|---|---|---|---|
| 6,411,583 B1 * | 6/2002 | Yamamoto et al. | 720/647 |
| 6,834,919 B1 * | 12/2004 | Mariano | 312/223.2 |
| 7,510,250 B2 * | 3/2009 | Lin et al. | 312/223.2 |
| 7,679,897 B2 * | 3/2010 | Xu et al. | 361/679.37 |
| 7,722,136 B2 * | 5/2010 | Chen et al. | 312/223.2 |
| 8,348,358 B2 * | 1/2013 | Huang et al. | 312/223.2 |

* cited by examiner

*Primary Examiner* — James O Hansen
(74) *Attorney, Agent, or Firm* — Altis Law Group, Inc.

(57) ABSTRACT

An electronic device enclosure includes a cabinet, a door, a connection element, a spacing element, and a torsion spring. The cabinet includes a front panel and a standing table. The front panel defines an opening for receiving the standing table. A pair of first engagement portions extends from the standing table. The standing table defines a spacing hole. The door includes a pair of second engagement portions and a pair of third engagement portions. The connection element includes a pair of first shafts and second shafts respectively engaged with the first engagement portions and the second engagement portions. The spacing element includes a sliding portion and two arms, the sliding portion is received in the spacing hole, and a pair of third shafts extends outward from the arms and is engaged with the third engagement portions. The torsion spring is fixed between the door and the connection element.

9 Claims, 5 Drawing Sheets

ELECTRONIC DEVICE ENCLOSURE WITH ROTATABLE DOOR

BACKGROUND

1. Technical Field

The present disclosure relates to electronic device enclosures and, particularly, to an electronic device enclosure with a rotatable door.

2. Description of Related Art

Computer enclosures include a cabinet, a compact disk (CD) driver, and a door. The cabinet includes a front panel, which defines an opening. The CD driver is received in the cabinet and can be accessed through the opening. The door is rotatably secured to the front panel, and opens and closes the opening for the CD driver.

The door forces the front panel open and is resisted by the front panel after the door is opened. Therefore, the front panel may be damaged.

Therefore, it is desirable to provide an electronic device enclosure, which can overcome the limitations described.

DETAILED DESCRIPTION

Embodiments of the present disclosure will now be described in detail, with reference to the accompanying drawings.

Figure 1:
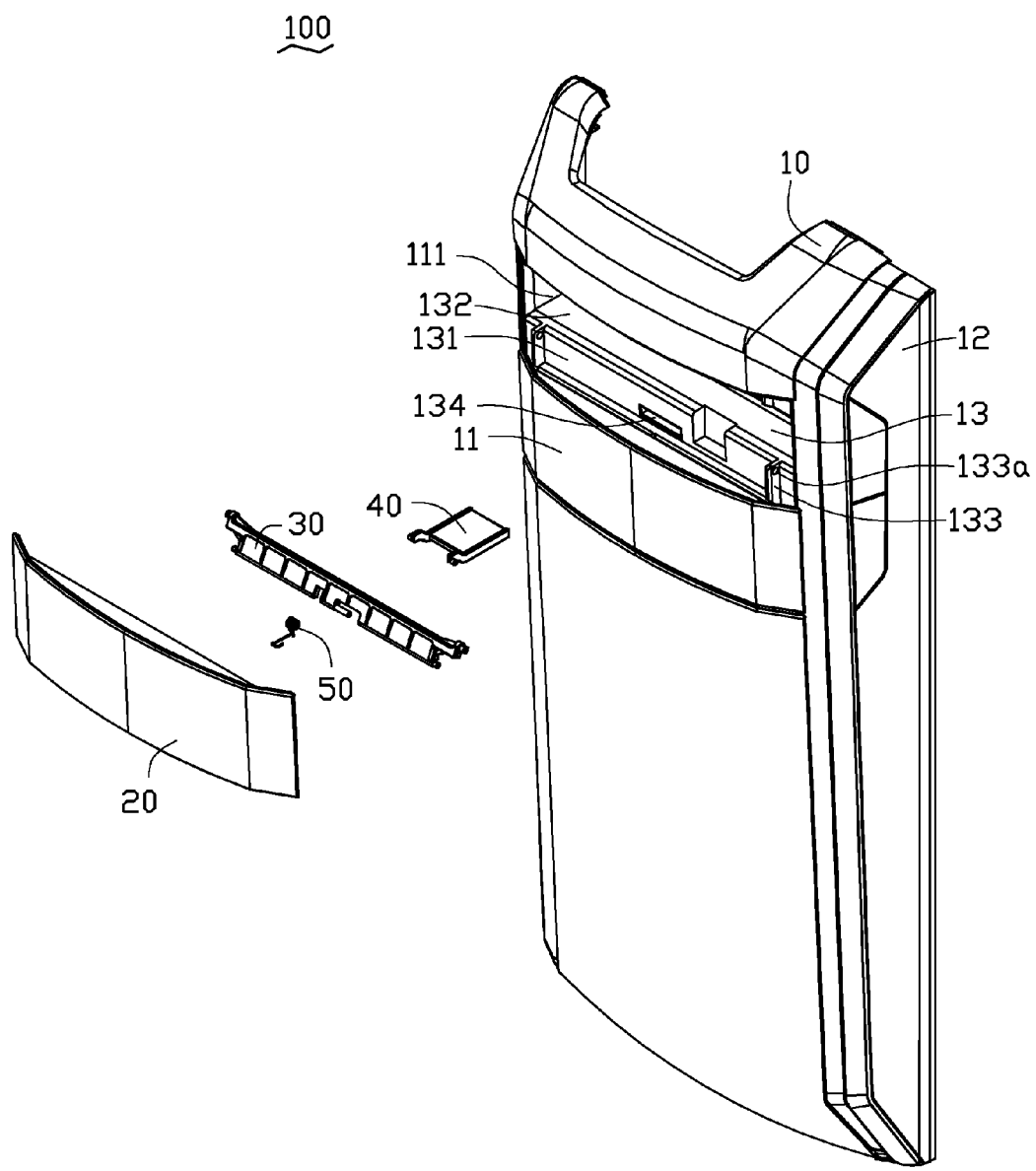
FIG. 1 is an isometric exploded view of an electronic device enclosure in accordance with an exemplary embodiment, the electronic device enclosure including a cabinet.
Figure 2:
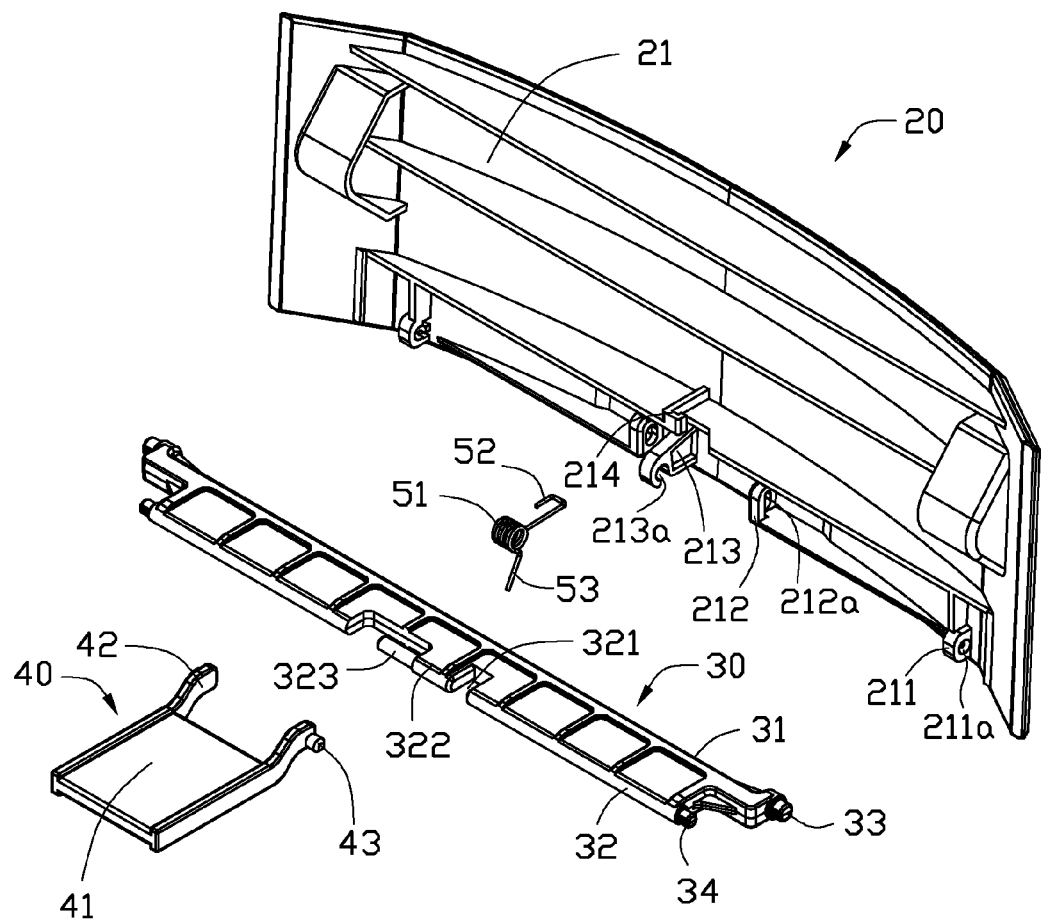
FIG. 2 is another isometric exploded view of the electronic device enclosure of FIG. 1, viewed from another angle, in which the cabinet is removed.

Referring to FIGS. 1-2, an electronic device enclosure 100, according to an exemplary embodiment, includes a cabinet 10, a door 20, a connection element 30, a spacing element 40, and a torsion spring 50.

The cabinet 10 includes a front panel 11, two sidewalls 12, and a standing table 13. The front panel 11 is substantially rectangular and defines an opening 111 therethrough, substantially adjacent to one short edge. The two sidewalls 12 extend upright from the two long edges of the front panel 11 respectively. The standing table 13 is received in the opening 111, and connected between the two sidewalls 12. The standing table 13 includes a lateral surface 131 partly closing the opening 111 and an upper surface 132 substantially perpendicular to the lateral surface 131. Two first engagement portions 133 extend outward respectively from the lateral surface 131, substantially adjacent to the two sidewalls 12. Each of the first engagement portions 133 defines a first shaft hole 133a therethrough, substantially adjacent to the upper surface 132. The first shaft holes 133a are aligned with each other and cooperatively define a first axis (not labeled) substantially perpendicular to the sidewalls 12. The standing table 13 defines a spacing hole 134 on the lateral surface 131, substantially at the middle of the two first engagement portions 133 and facing away from the upper surface 132. The spacing hole 134 is a rectangular blind hole.

The shape of the door 20 is substantially similar to that of the opening 111. The door 20 includes an inner surface 21 and two opposite first sides 22. The cross-section of the door 20 is arc shaped, and the door 20 deforms toward the inner surface 21 from a middle portion to an edge portion thereof. A pair of second engagement portions 211 and a pair of third engagement portions 212 extend outwards from the inner surface 21, substantially adjacent to one of the first sides 22. The third engagement portions 212 are positioned between the second engagement portions 211. Each of the second engagement portions 211 defines a second shaft hole 211a therethrough. Each of the third engagement portions 212 defines a third shaft hole 212a therethrough. The second shaft holes 211a are aligned with each other and cooperatively define a second axis (not labeled) substantially parallel to the first sides 22. The third shaft holes 212a are aligned with each other and cooperatively define a third axis (not labeled) substantially parallel to the second axis. Each of the third shaft holes 212a is an elongated hole, and extends along a direction substantially perpendicular to the first sides 22. A positioning seat 213 extends outward from the inner surface 21 and is positioned between the third engagement portions 212. The positioning seat 213 defines a positioning hole 213a aligned with the second shaft holes 211a. A fixing portion 214 extends outward from the inner surface 21, located between the center of the inner surface 21 and the positioning seat 213.

The connection element 30 is substantially a strip, and includes a first side surface 31 and a second side surface 32 substantially parallel and opposite to the first side surface 31. A pair of first shafts 33 extends outward from two ends of the connection element 30, substantially adjacent to the first side surface 31 and along a direction that is substantially parallel to the first side surface 31. A pair of second shafts 34 extends outward from two ends of the connection element 30, substantially adjacent to the second side surface 32 and along a direction that is substantially parallel to the second side surface 32. The connection element 30 defines a slot 321 in the second side surface 32, substantially at the middle thereof. The width of the slot 321 (i.e., the length of the slot 321 along the lengthwise direction of the connection element 30) is slightly greater than the distance between the two third engagement portions 212. A connection portion 322 extends from the connection element 30 into the slot 321, and a positioning shaft 323 extends outward from one side of the connection portion 322 along the lengthwise direction of the connection element 30. The positioning shaft 323 aligns with the second shafts 34.

The spacing element 40 includes a sliding portion 41 and two arms 42. Each of the arms 42 is Z-shaped. The two arms 42 are positioned on a same end of the sliding portion 41, and respectively adjacent to two opposite edges of the sliding portion 41. A pair of third shafts 43 extends outward from an end of the two corresponding arms 42, in opposite directions.

The torsion spring 50 includes a ring portion 51, a first fixing terminal 52, and a second fixing terminal 53. One end of the first fixing terminal 52 and one end of the second fixing terminal 53 are connected with the ring portion 51 respectively. The first fixing terminal 52 crosses the second fixing terminal 53 with an obtuse angle.

Figure 3:
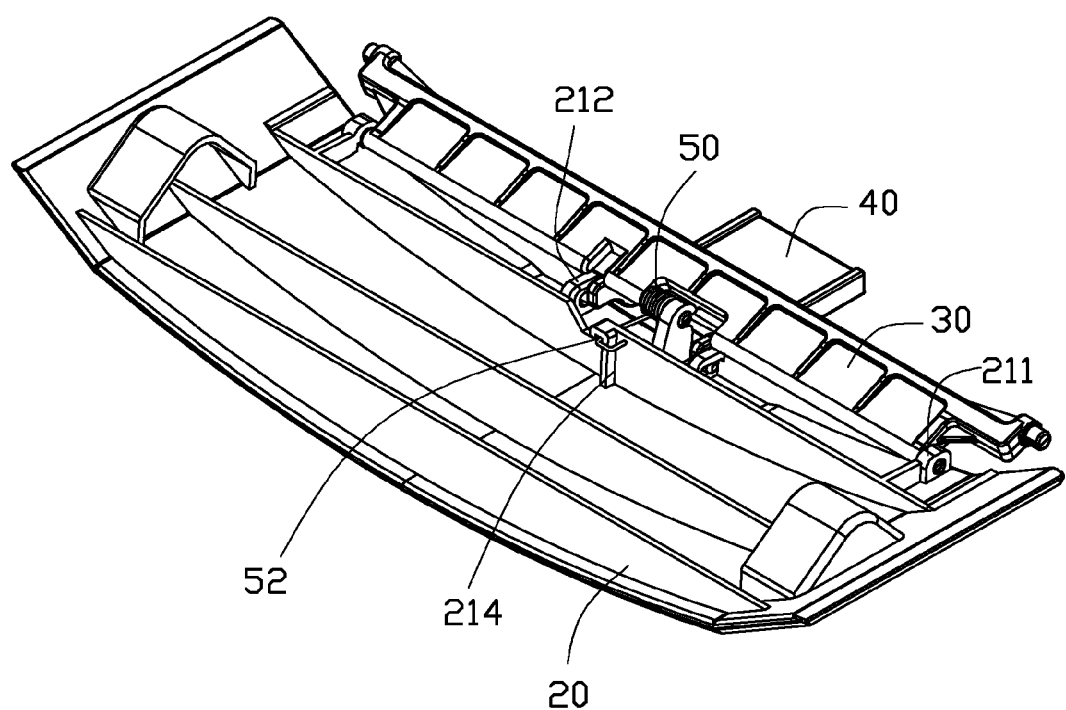
FIG. 3 is an assembled view of the electronic device enclosure of FIG. 2.
Figure 4:
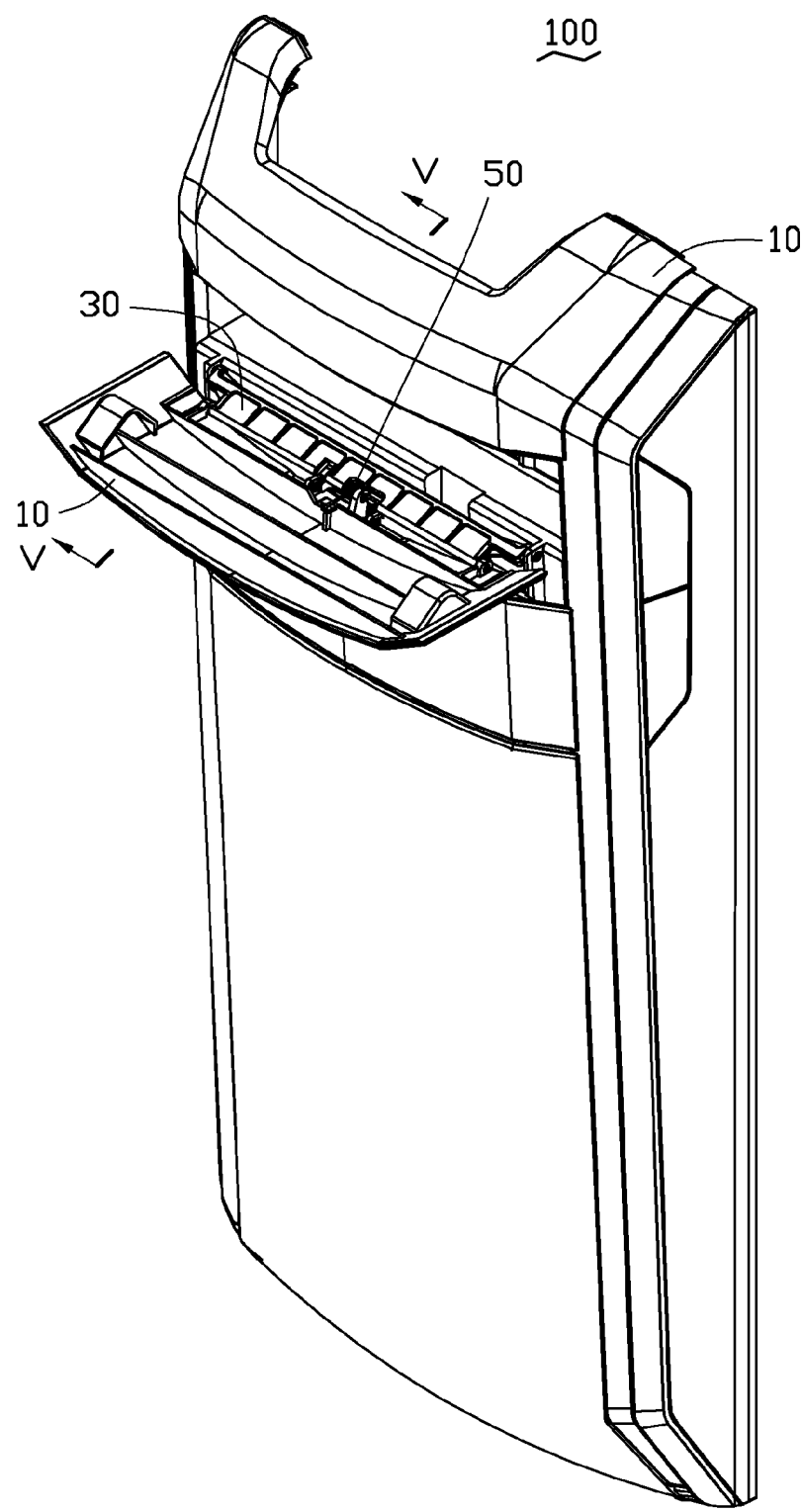
FIG. 4 is an assembled view of the electronic device enclosure of FIG. 1.
Figure 5:
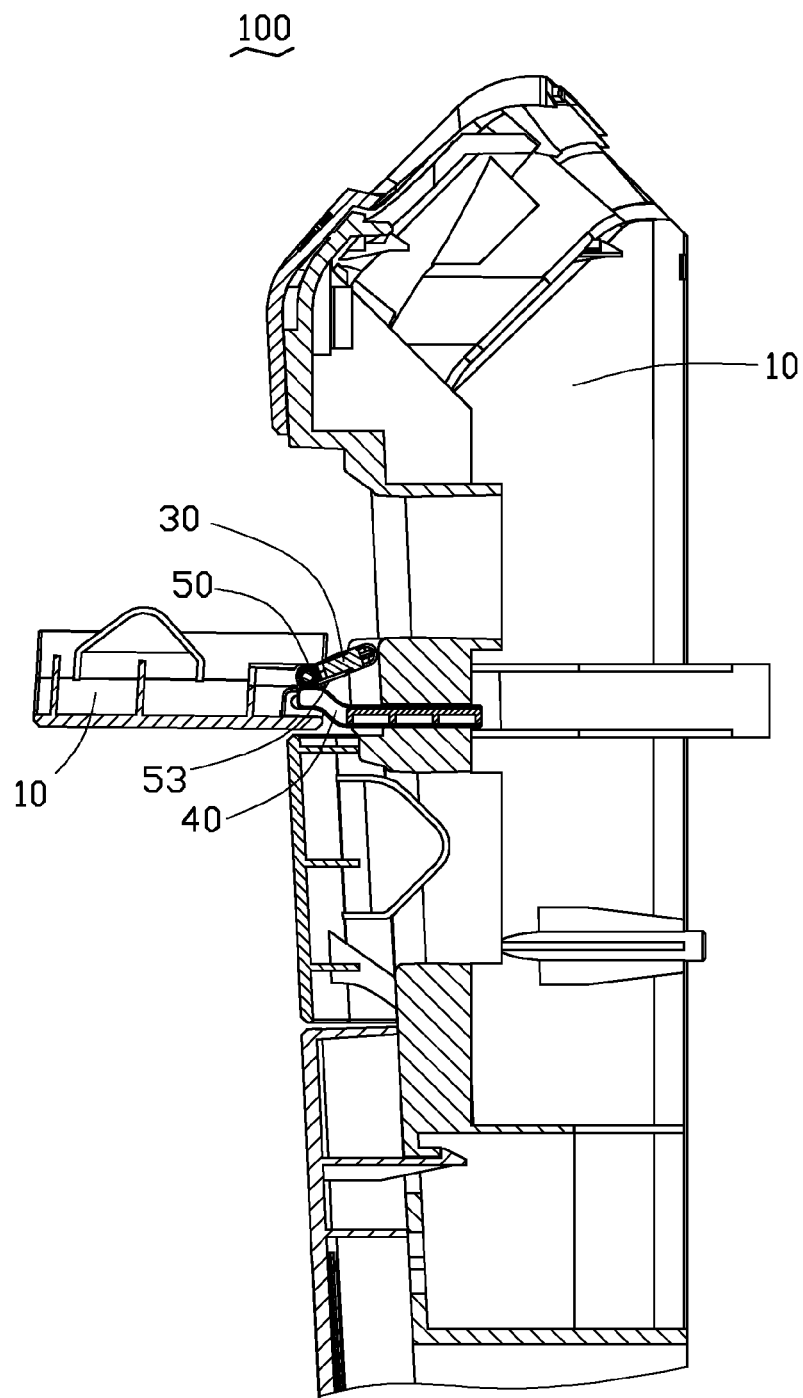
FIG. 5 is a cross-sectional view of the electronic device enclosure, taken along a line V-V of FIG. 4.

Referring to FIGS. 3-5, in assembly, the third shafts 43 of the spacing element 40 are received in the third shaft holes 212a of the door 20. The ring portion 51 of the torsion spring 50 is sleeved on the positioning shaft 323 of the connection element 30. The positioning shaft 323 is received in the positioning hole 213a of the door 20. The second shafts 34 of the connection element 30 are received in the second shaft holes 211a of the door 20. The inner surface 21 of the door 20 opposes the opening 111. The first fixing terminal 52 and the second fixing terminal 53 of the torsion spring 50 are respectively fixed on the fixing portion 214 of the door 20 and the connection element 30. Then, the sliding portion 41 of the spacing element 40 is received in the spacing hole 134 of the standing table 13. The first shafts 33 of the connection element 30 are received in the first shaft holes 133a of the standing table 13. In the initial state, the first fixing terminal 52 and the second fixing terminal 53 are twisted. The opening 111 is closed by the door 20 operated by the restoring force of the torsion spring 50.

During the opening process, an external force is operated on the door 20, the door 20 rotates around the second shafts 34. The connection element 30 rotates around the first shafts 33. In the process of opening, the door 20 drives the spacing element 40 to move in the spacing hole 134. The third shafts 43 move in the third shaft holes 212a. As the third shafts 43 move to resist on one end of the third shaft holes 212a, the rotation angle of the door 20 is limited by the spacing element 40. When the external force is away from the door 20, the door 20 is closed under the restoring force of the torsion spring 50.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. An electronic device enclosure comprising:
    a cabinet comprising a front panel and a standing table, the front panel defining an opening, the standing table being received in the opening and comprising a lateral surface the lateral surface facing the opening and partly closing the opening, the cabinet comprising a pair of first engagement portions extending outward from the lateral surface, the standing table defining a spacing hole in the lateral surface;
    a door comprising an inner surface facing the opening, a pair of second engagement portions and a pair of third engagement portions, the second and third engagement portions extending outward from the inner surface, the third engagement portions positioned between the second engagement portions;
    a connection element comprising a pair of first shafts and a pair of second shafts, the first shafts aligned with each other and rotatably engaged with the first engagement portions, the second shafts aligned with each other and rotatably engaged with the second engagement portions, the connection element comprising a positioning shaft, the positioning shaft aligned with the second shafts;
    a spacing element comprising a sliding portion and two arms positioned at one side of the sliding portion, the sliding portion being movably received in the spacing hole, the spacing element comprising a pair of third shafts, the third shafts extending outward from the arms and rotatably engaged with the third engagement portions; and
    a torsion spring comprising a ring portion sleeved on the positioning shaft, a first fixing terminal fixed to the door, and a second fixing terminal fixed to the connection element, the torsion spring configured for forcing the door to close the opening.

2. The electronic device enclosure of claim 1, wherein the cabinet further comprises two sidewalls extending from two edges of the front panel, the standing table is connected between the two sidewalls.

3. The electronic device enclosure of claim 1, wherein the door has an arc-shaped cross-section.

4. The electronic device enclosure of claim 3, wherein the connection element comprises a first side surface and a second side surface, the second side surface is parallel to and opposite to the first side surface, the first shafts extend outward from two ends of the connection element and are adjacent to the first side surface, the first shafts are arranged in a line substantially parallel to the first side surface, the second shafts extend outward from two ends of the connection element and are adjacent to the second side surface, the second shafts are arranged in another line substantially parallel to the second side surface.

5. The electronic device enclosure of claim 4, wherein the door comprises a positioning seat, the positioning seat extends from the inner surface and is positioned between the third engagement portions, the connection element defines a slot on the second side surface and comprises a connection portion, the connection portion extends from the connection element into the slot, and the positioning shaft extends outward from one side of the connection portion and engages with the positioning seat.

6. The electronic device enclosure of claim 5, wherein one end of the first fixing terminal and one end of the second fixing terminal are connected with the ring portion.

7. The electronic device enclosure of claim 5, wherein each first engagement portion defines a first shaft hole, each first shaft is rotatably received in a corresponding first shaft hole, each second engagement portion defines a second shaft hole, each second shaft is rotatably received in a corresponding second shaft hole, the positioning seat defines a positioning hole, the positioning hole aligns with the second shaft holes of the second engagement portions, the positioning shaft is rotatably received in the positioning hole.

8. The electronic device enclosure of claim 5, wherein each third engagement portion defines a third shaft hole, each third shaft is rotatably received in a corresponding third shaft hole.

9. The electronic device enclosure of claim 8, wherein each of the third shaft holes is an elongated hole.

* * * * *